United States Patent [19]

Nakai et al.

[11] Patent Number: 5,304,903
[45] Date of Patent: Apr. 19, 1994

[54] BRUSHLESS MOTOR DRIVING METHOD AND APPARATUS

[75] Inventors: Mitsuhisa Nakai; Shiro Maeda; Toshiaki Yagi, all of Kusatsu, Japan

[73] Assignee: Matsushita Electric Industrial Co., Ltd., Osaka, Japan

[21] Appl. No.: 59,348

[22] Filed: May 6, 1993

Related U.S. Application Data

[63] Continuation of Ser. No. 768,544, Sep. 30, 1991, abandoned.

[30] Foreign Application Priority Data

Feb. 14, 1990 [JP] Japan .................. 2-34320

[51] Int. Cl.$^5$ .............................. H02P 7/00
[52] U.S. Cl. ........................... 318/254; 318/439
[58] Field of Search ........... 318/254, 439, 138, 139, 318/432, 434, 799-812

[56] References Cited

U.S. PATENT DOCUMENTS

| | | | |
|---|---|---|---|
| 3,937,974 | 2/1976 | Lafuze | 318/138 X |
| 4,403,177 | 9/1983 | Weber et al. | 318/254 |
| 4,565,957 | 1/1986 | Gary et al. | 318/723 |
| 4,580,082 | 4/1986 | Guerin-Pinaud | 318/439 X |
| 4,641,066 | 2/1987 | Nagata et al. | 318/254 |
| 4,700,116 | 10/1987 | Inoue et al. | 318/254 |
| 4,743,815 | 5/1988 | Gee et al. | 318/254 |
| 4,835,448 | 5/1989 | Dishner et al. | 318/254 |
| 4,874,993 | 10/1989 | Tanaka et al. | 318/254 |
| 4,879,498 | 11/1989 | Shinohara et al. | 318/254 |
| 4,983,894 | 1/1991 | Oku et al. | 318/138 |
| 4,987,351 | 1/1991 | Disser et al. | 318/811 X |
| 5,006,768 | 4/1991 | Rozman | 318/254 |

OTHER PUBLICATIONS

Kenichi Iizuka, et al "Microcomputer Control for Sensorless Brushless Motor," IEEE Transactions on Industry Applications, vol. IA-21, No. 4, 1985, pp. 595-601.
Dr. Andreas Brandstatter, "Servo-Schrittmotoren-Systeme fur Spezielle Aufgaben," de/der elektromeister und deutsches elektrohandwerk, de 17/88, pp. 1123-1127.

*Primary Examiner*—Jonathan Wysocki
*Attorney, Agent, or Firm*—Stevens, Davis, Miller & Mosher

[57] ABSTRACT

In a brushless motor, the frequency of an output signal of a synchronizing signal generation unit, a duty ratio in a synchronized operation mode and a duty ratio in a rotator position detection operation mode are set such that a rotating speed in the rotator position detection operation mode becomes equal to or lower than a rotating speed in the synchronized operation mode, thereby enabling smooth change-over from the synchronized operation mode to the rotator position detection operation mode.

2 Claims, 4 Drawing Sheets

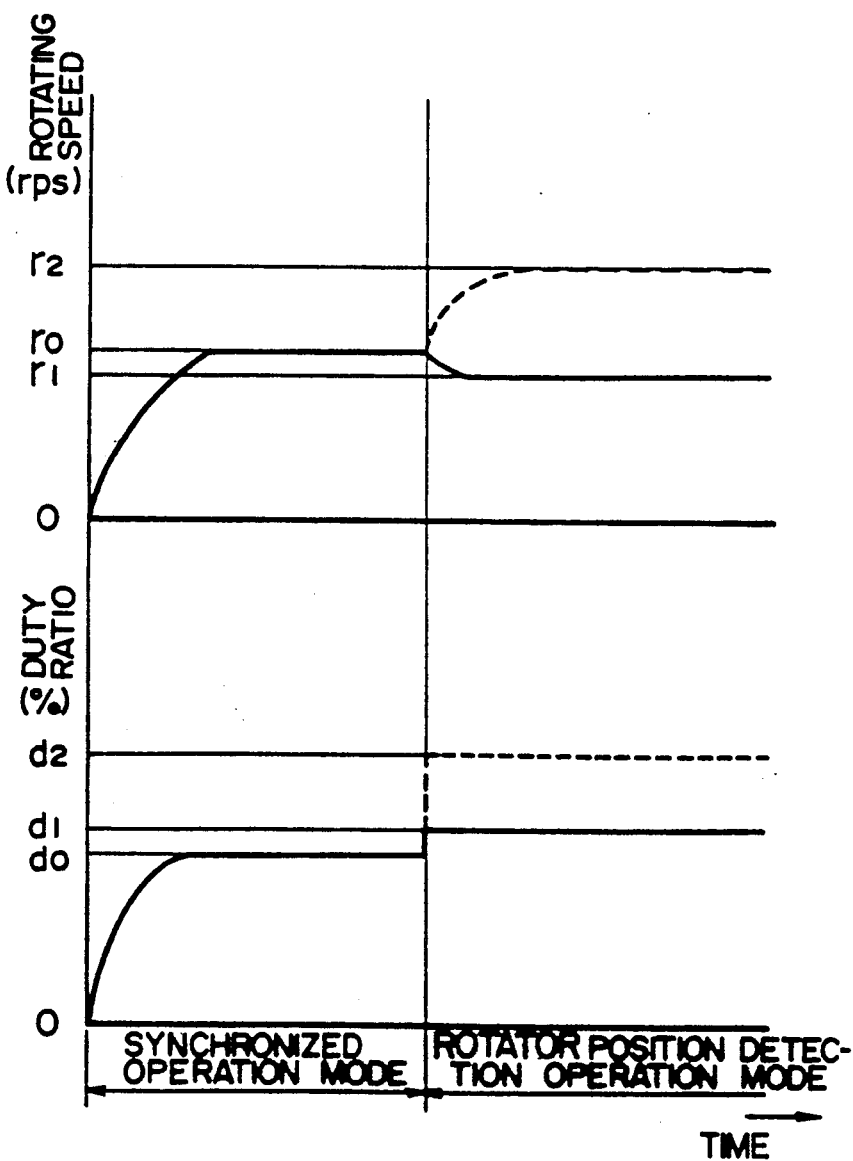

BRUSHLESS MOTOR DRIVING METHOD AND APPARATUS

This application is a continuation of application Ser. No. 07/768,544, filed Sep. 30, 1991 (abandoned).

TECHNICAL FIELD

The present invention relates to a brushless motor, especially, a brushless motor in which a rotator pole position detector is omitted by detecting the relative position of a magnet rotator and an armature winding from an induced voltage induced in the armature winding, and more particularly to the driving of such a brushless motor for enabling smooth transition from a synchronized operation mode to a rotator position detection operation mode.

BACKGROUND ART

Usually, a brushless motor needs a detector for detecting the position of magnetic poles of a rotator of the motor. However, for example, in the case where the brushless motor is used in a compressor for an air conditioner, it is not possible to use such a rotator pole position detector since the reliability of the detector cannot be ensured under the condition of high temperature and high pressure. Accordingly, in such applications is employed a method which uses no pole position detector and in which a voltage signal induced in an armature winding is detected and a commutation signal of the motor is generated on the basis of the detected voltage signal.

However, since the voltage signal is induced in the armature winding only in the case where the rotator is rotating, no pole position information can be obtained in the case where the rotator is stopped. In other words, the voltage signal is not available when the motor starts rotation. Accordingly, a specified signal for causing a rotating magnetic field to generate in the armature winding irrespective of the pole position of the rotator is applied upon starting to forcibly rotate the rotator.

Thereafter, the rotator starts to rotate and a voltage signal induced in the armature widing is detected, thereby making it possible to generate a commutation signal of the motor on the basis of the detected voltage signal. Thus, the brushless motor is driven in the method in which the motor is activated in the synchronized operation mode and is thereafter changed over to the rotator position detection operation mode. The adjustment of a voltage supplied to the motor is made using a so-called pulse width modulation scheme in which a voltage is controlled by controlling a duty ratio of a voltage signal pulse with a DC power source voltage being constant.

Various methods have been proposed for the change-over between the synchronized operation mode and the rotator position detection operation mode. In many cases, however, it is difficult to make the switching while a stable condition of operation being kept and a load is imposed on motor driving semiconductor switching elements due to the generation of a mechanical vibration or instantaneous increase of a driving current.

DISCLOSURE OF INVENTION

Therefore, the present invention is provided with a construction in which a relationship between a rotating speed in a synchronized operation mode and a rotating speed in a rotator position detection operation mode is such that the rotating speed in the rotator position detection operation mode is made equal to or lower than the rotating speed in the synchronized operation mode.

Further, the present invention is provided with a construction comprising a three-phase armature winding connected with an ungrounded neutral point a DC power source, a group of semiconductor switching elements for passing/interrupting a current to the armature winding, a brushless motor having a magnet rotator, start command means, synchronizing signal generation means for outputting a synchronizing signal in accordance with a command from the start command means, rotating magnetic field generation means for generating a rotating magnetic field in the armature winding by use of a signal outputted from the synchronizing signal generation means, position detection means for detecting the relative position of the armature winding and the magnet rotator in accordance with a voltage signal induced in the armature winding, change-over means for providing an output signal of the rotating magnetic field generation means and an output signal of the position detection means in a selectively changing-over manner, change-over command means for issuing a change-over command to the change-over means, driving signal generation means for generating a driving current of the switching element group by use of an output signal of the change-over means, duty ratio command means, and pulse width modulation means for subjecting an output signal of the driving signal generation means to pulse width modulation on the basis of a command from the duty ratio command means, wherein after the generation of the command from the activation command means, the frequency of the output signal of the synchronizing signal generation means and the duty ratio command are outputted to start the rotation of the magnet rotator and after the start, the change-over means is switched to drive the brushless motor on the basis of the output signal of the position detection means.

In the rotator position detection operation mode, the rotating speed is determined by the characteristic of the motor and the condition of a load for a given duty ratio. In the present invention, with the above-mentioned construction, the rotating speed and the duty ratio in the synchronized operation mode and the duty ratio in the rotator position detection operation mode are set so as to provide a relationship between the rotating speed in the synchronized operation mode and the rotating speed in the rotator position detection operation mode such that the rotating speed in the rotator position detection operation mode becomes equal to or smaller than the rotating speed in the synchronized operation mode. Thereby, smooth change-over from the synchronized operation mode to the rotator position detection operation mode is possible.

BRIEF DESCRIPTION OF DRAWINGS

FIG. 4 is a waveform diagram showing a relationship between a rotating speed and a duty ratio in a synchronized operation mode and a rotator position detection operation mode in the apparatus shown in FIG. 1.

BEST MODE FOR CARRYING OUT THE INVENTION

An embodiment of the present invention will now be described in reference to the drawings.

Figure 1:
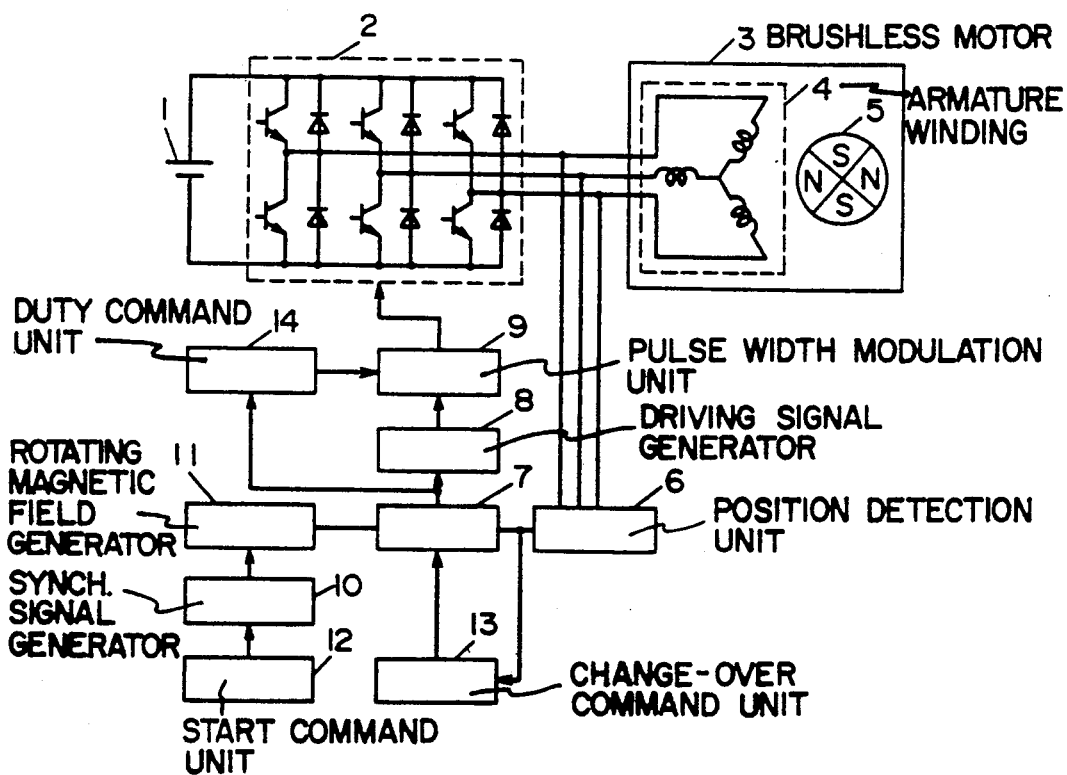
FIG. 1 is a block diagram of a brushless motor driving apparatus according to an embodiment of the present invention.

FIG. 1 is a block diagram of a brushless motor driving apparatus according to an embodiment of the present invention. In FIG. 1, reference numeral 1 designates a DC power source, and numeral 2 designates a semiconductor switching element group which is composed of six transistors and six diodes connected in inverse parallel with the transistors. Numeral 3 designates a brushless motor which is composed of a three-phase connected armature winding 4 and a magnet rotator 5. Numeral 6 designates position detection means, numeral 7 change-over means, numeral 8 driving signal generation means, numeral 9 pulse width modulation means, numeral 10 synchronizing signal generation means, numeral 11 rotating magnetic field generation means, numeral 12 start command means, numeral 13 change-over command means, and numeral 14 duty ratio command means.

With the above construction, upon starting, an output voltage of the rotating magnetic field generation means 11 is sent to the driving signal generation means 8 through the change-over means and an output signal of the driving signal generation means 8 is subjected to pulse width modulation set for a synchronized operation mode to drive the transistors in the semiconductor witching element group 2, thereby activating the brushless motor 3. As the brushless motor 3 starts to rotate, the position of magnetic poles of the magnet rotator 5 is detected by the position detection means 6 on the basis of an induced voltage generated in the armature winding 4. The detection signal is sent to the driving signal generation means 8 through the change-over means 7 and an output of the driving signal generation means 8 is subjected to pulse width modulation set for a rotator position detection operation mode to drive the transistors in the semiconductor switching element group 2, thereby controlling the brushless motor 3.

Figure 2:
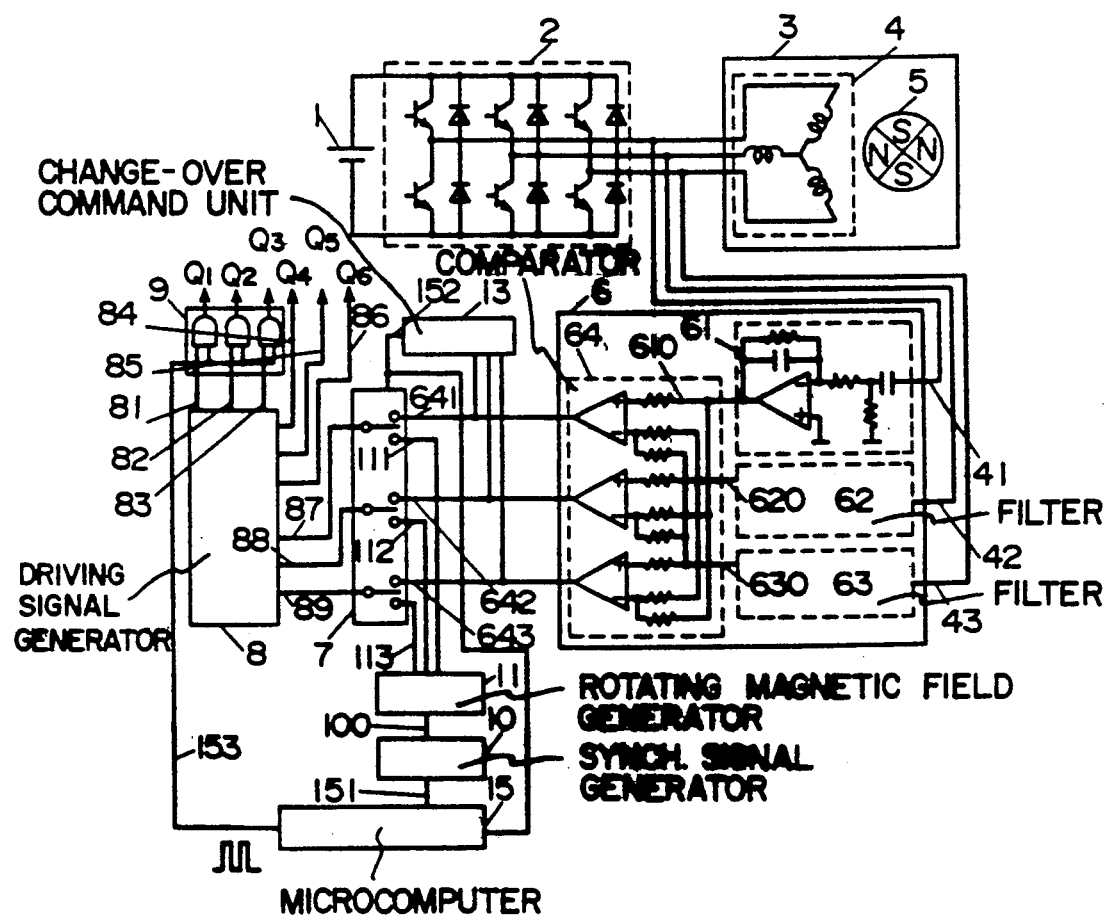
FIG. 2 is a circuit diagram showing the details of the apparatus shown in FIG. 1.

FIG. 2 shows more concretely the block diagram of FIG. 1. In FIG. 2, the same components as those shown in FIG. 1 or the components having the same functions as those shown in FIG. 1 are provided with the same reference numerals as those used in FIG. 1.

In FIG. 2, reference numerals 1 to 5 are the same as those used in FIG. 1. Numeral 6 designates a position detection circuit which is composed of three filters 61 to 63 and a comparator section 64. Numeral 7 designates a change-over circuit, numeral 8 a driving signal generation circuit, numeral 9 a pulse width modulation circuit, numeral 10 a synchronizing signal generation circuit, numeral 11 a rotating magnetic field generation circuit, numeral 13 a change-over command circuit, and numeral 15 a microcomputer which corresponds to the activation command means 12 and the duty ratio command means shown in FIG. 1. The microcomputer 15 output a start command signal 151 to the synchronizing signal generation circuit 10 and a duty ratio command signal 153 to the pulse width modulation circuit 9.

The operation of the embodiment of the brushless motor driving apparatus having the above construction will be described.

Figure 3:
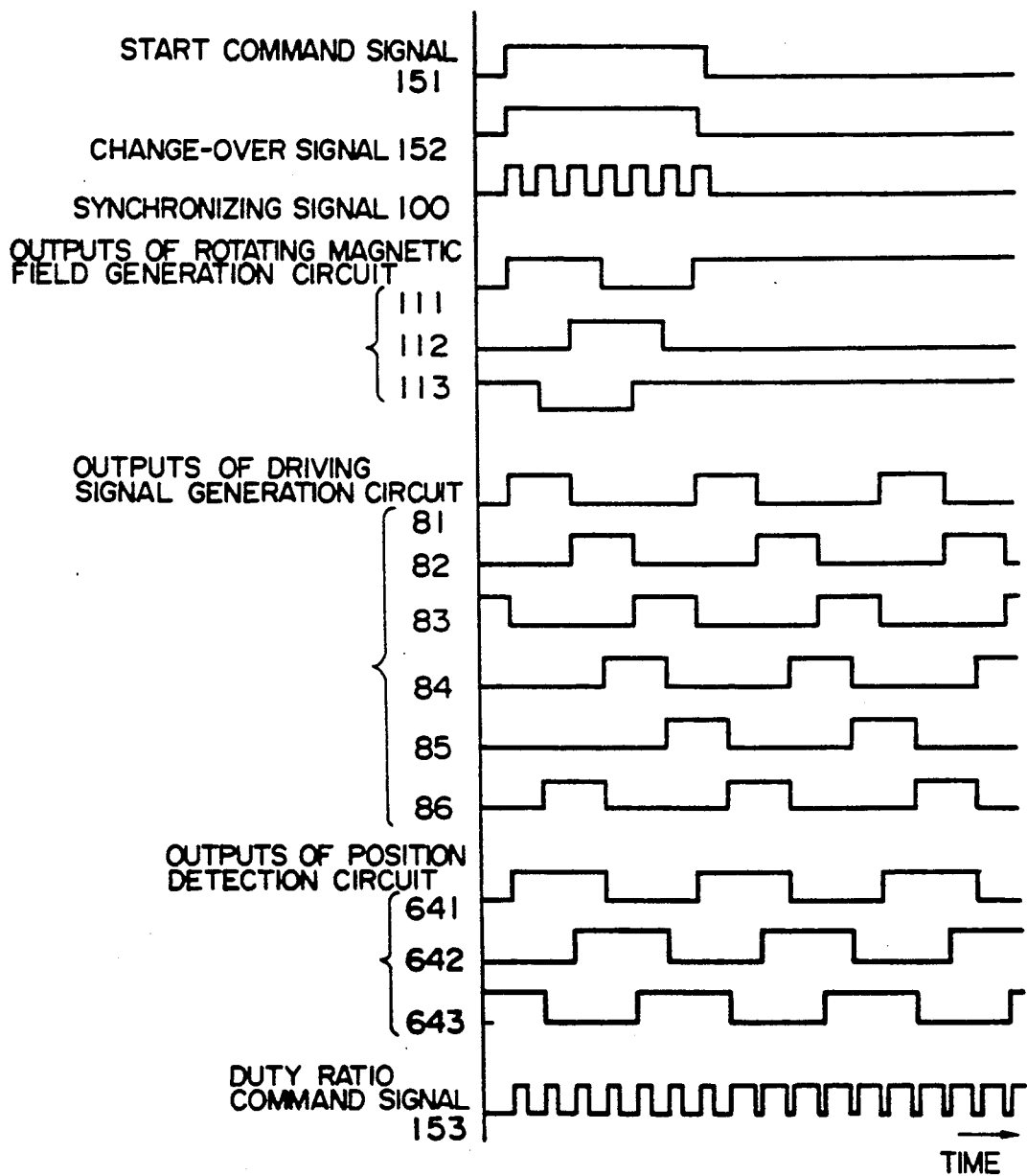
FIG. 3 is a diagram showing waveforms of respective parts in the circuit diagram shown in FIG. 2.

Firstly, the microcomputer 15 outputs a start command signal 151, a change-over signal 152 and a duty-ratio command signal 153 at the same time. When receiving the start command signal, the synchronizing signal generation circuit 10 outputs a synchronizing signal 100 as shown in FIG. 3. On the basis of the synchronizing signal 100, the rotating magnetic field generation circuit 11 outputs signals 111 to 113 as shown in FIG. 3. The change-over circuit 7 is a circuit for providing output signals of the position detection circuit 6 and the output signals of the rotating magnetic field generation circuit 11 as input signals 87 to 89 of the driving signal generation circuit 8 in a selectively changing-over manner. Upon starting, the change-over circuit 7 is switched to the side of the output signal of the rotating magnetic field generation circuit 11 by the change-over signal 152. The output signals 111 t 113 of the rotating magnetic field generation circuit 11 are provided to the driving signal generation circuit 8 which is turn generates output signals 81 to 86 as shown in FIG. 3. The signals 81 to 83 among the output signals 81 to 86 are inputted to the pulse width modulation circuit 9 and are therein subjected to pulse width modulation on the basis of the duty ratio command signal 153 set for a synchronized operation mode. The pulse width modulated signals serve as driving signals of transistors $Q_1$ to $Q_3$ in the semiconductor switching element group 2. On the other hand, the output signals 84 to 86 of the driving signal generation circuit 8 serve as driving signals of transistors $Q_4$ to $Q_6$ in the semiconductor switching element group 2, as they are. The six transistors in the semiconductor switching element group 2 are switched by those driving signals. As a result, a rotating magnetic field is generated in the armature winding 4 so that the magnet rotator 5 rotates, thereby starting, the brushless motor 3.

The synchronizing signal 100 and the duty ratio command signal 153 set for the synchronized operation mode are outputted simultaneously with the rise of the start command signal 151 and the brushless motor rotates.

After the starting, the change-over command circuit 13 outputs a change-over signal 152 to switch the change-over circuit 7 to the position detection circuit 6 side. Thereby, the input signals 87 to 89 of the driving signal generation circuit 8 become the output signals 641 to 643 of the position detection circuit 6. Subsequently, the brushless motor 3 is driven by induced voltage signals 41 to 43 generated in the armature winding 4. Also, a duty ratio command signal set for a rotator position detection operation mode is outputted from the microcomputer 15 by the change-over signal 152 and simultaneously therewith. The start command signal 151 is removed subsequently to the fall of the change-over signal 152, thereby resetting a series of starting operation procedures to the initial condition.

In the series of operations mentioned above, the synchronizing signal 100, the duty ratio command signal 153 for the synchronized operation mode and the duty ratio command signal 153 for the rotator position detection operation mode are set such that a rotating speed after the change-over from the synchronized operation mode to the rotator position detection operation mode becomes equal to or lower than a rotating speed in the synchronized operation mode. This will now be explained in reference to FIG. 4. In the synchronized operation mode, the starting is made with a rotating speed of $r_0$ and a duty ratio of $d_0$. These values are set considering restrictions such as the specification and load condition of the motor, an allowable current value of the semiconductor switching element group, and so on. In the rotator position detection operation mode, a duty ratio is set to $d_1$ and a rotating speed $r_1$ is set so as to satisfy $r_1 \leq r_0$. With this procedure, smooth change-over from the synchronized operation mode to the rotator position detection operation mode is realized. For example, if a duty ratio in the rotator position detection mode is set to $d_2$, a rotating speed $r_2$ becomes higher than $r_1$. In this case, sudden acceleration takes place upon transition to the rotator position detection operation mode. Therefore, smooth mode change-over cannot be expected.

In the rotator position detection operation mode, the duty ratio command signal 153 is outputted as an application voltage control command for speed control of the brushless motor 3 from the microcomputer 15.

In the embodiment, the synchronizing signal generation circuit 10, the rotating magnetic field generation circuit 11 and the change-over command circuit 13 are provided as independent circuits. However, a part or all of the functions of those circuits may be performed by the microcomputer 15.

INDUSTRIAL APPLICABILITY

As has been mentioned above, the present invention is provided with a three-phase armature winding connected with an ungrounded neutral point a DC power source, a group of semiconductor switching elements for passing/interrupting a current to the armature winding, a brushless motor having a magnet rotator, start command means, synchronizing signal generation means for outputting a synchronizing signal in accordance with a command from the start command means, rotating magnetic field generation means for generating a rotating magnetic field in armature winding by use of a signal outputted from the synchronizing signal generation means, position detection means for detecting the relative position of the armature winding and the magnet rotator in accordance with a voltage signal induced in the armature winding, change-over means for providing an output signal of the rotating magnetic field generation means and an output signal of the position detection means in a selectively changing-over manner, change-over command means for issuing a switching command to the change-over means, driving signal generation means for generating a driving current of the switching element group by use of an output signal of the change-over means, duty ratio command means, and pulse width modulation means for subjecting an output signal of the driving signal generation means to pulse width modulation on the basis of a command from the duty ratio command means, wherein the frequency of the output signal of the synchronizing signal generation means, a duty ratio in a synchronized operation mode and a duty ratio in a rotator position detection operation mode are set such that a rotating speed in the rotator position detection operation mode becomes equal to or lower than a rotating speed in the synchronized operation mode, thereby enabling smooth change-over from the synchronized operation mode to the rotator position detection operation mode.

We claim:

1. An apparatus for driving a brushless motor having a three-phase armature winding connected with an ungrounded neutral point and a magnet rotator, said apparatus comprising:

a group of semiconductor switching elements for passing/interrupting a pulse width modulated current to said armature winding, start command means for outputting a start command, synchronizing signal generation means for outputting a synchronizing signal in accordance with said start command from said start command means, rotating magnetic field generation means for generating a rotating magnetic field in said armature winding in response to said synchronizing signal to drive said brushless motor in a synchronized operation mode, position detection means for detecting a relative position of said armature winding and said magnet rotator in accordance with a voltage signal that is induced in said armature winding in response to said rotating magnetic field, change-over means for providing an output signal comprising either one of an output signal of said rotating magnetic field generation means and an output signal of said position detection means in a selectively changing-over manner, change-over command means for issuing a change-over command to said change-over means, driving signal generating means for generating a driving current for said group of semiconductor switching elements in response to said output signal of said change-over means, duty ratio command means for outputting a duty ratio command, and pulse width modulation means for subjecting said driving current generated by said driving signal generation means to pulse width modulation on the basis of said duty ratio command to output said pulse width modulated current to said group of semiconductor switching elements to drive said brushless motor in a rotator position detection operation mode when said output signal from said change-over means comprises said output signal of said position detection means, said duty ratio command means comprising means for setting said duty ratio command such that a rotating speed in the rotator position detection operation mode is equal to or lower than a rotating speed in the synchronized operation mode.

2. A driving method for a brushless motor having an armature winding and a magnet rotator, the method comprising:

(a) starting the brushless motor in a synchronized operation mode in which the brushless motor is driven by an external forced commutation signal;

(b) detecting a voltage signal induced in the armature winding of the brushless motor;

(c) generating a brushless motor commutation signal from a signal obtained by converting the voltage signal;

(d) after step (a), operating the brushless motor in a rotor position detection operation mode in which the brushless motor is driven by the brushless motor commutation signal; and (e) setting the rotating speed and the duty ratio in the synchronized operation mode and the duty ratio in the rotator position detection operation mode so that a rotating speed in the rotator position detection operation mode is equal to or smaller than the rotating speed in the synchronized operation mode.

* * * * *